United States Patent [19]

Cole, Jr.

[11] 4,228,030

[45] Oct. 14, 1980

[54] LIQUID CRYSTAL COMPOSITIONS

[75] Inventor: Herbert S. Cole, Jr., Scotia, N.Y.

[73] Assignee: General Electric Company, Schenectady, N.Y.

[21] Appl. No.: 15,771

[22] Filed: Feb. 28, 1979

[51] Int. Cl.$^2$ ............................ C09K 3/34; G02F 1/13
[52] U.S. Cl. .................................... 252/299; 252/408; 350/349; 350/350 R
[58] Field of Search ................ 252/299, 408; 350/350, 350/349

[56] References Cited

U.S. PATENT DOCUMENTS

| | | | |
|---|---|---|---|
| 3,947,375 | 3/1976 | Gray et al. | 252/299 |
| 3,974,087 | 8/1976 | Gray et al. | 252/299 |
| 4,083,797 | 4/1978 | Oh | 252/299 |
| 4,128,497 | 12/1978 | Cole, Jr. et al. | 252/299 |
| 4,130,502 | 12/1978 | Eidenschink et al. | 252/299 |
| 4,137,192 | 1/1979 | Matsufuji | 252/299 |
| 4,143,947 | 3/1979 | Aftergut et al. | 252/299 |
| 4,154,697 | 5/1979 | Eidenschink et al. | 252/299 |

*Primary Examiner*—Teddy S. Gron
*Attorney, Agent, or Firm*—Geoffrey H. Krauss; James C. Davis; Marvin Snyder

[57] ABSTRACT

Novel liquid crystal compositions having extended temperature ranges, without sacrifice of stability, are provided by mixing 10–25%, by weight, of a terphenyl liquid crystal material with 75–90%, by weight, of a four-component liquid crystal composition of cyclohexanes.

4 Claims, No Drawings

LIQUID CRYSTAL COMPOSITIONS

BACKGROUND OF THE INVENTION

The present invention relates to liquid crystal compositions and, more particularly, to novel liquid crystal compositions having a terphenyl constituent mixed with a four-part cyclohexane constituent.

Use of liquid crystal displays is desirable, due in part, to the relatively low operating power consumption thereof. Typical liquid crystal materials for use in such displays, and typically utilized as a host material for a guest dichroic dye in dichroic liquid crystal displays, have generally been unable to provide a working temperature range from a melting point of less than 0° C. to a clearing point (the nematic-to-isotropic transition temperature) of greater than 85° C. In many applications, this extended temperature range of 0° C. to +85° C. is required. For example, commercially available liquid crystals of the biphenyl type, found to be useful for display devices due to relatively good stability and electro-optic behavior, may be eutectic mixtures, such as are sold under the designations E-7 and E-8 by BDH Chemicals, of Great Britain; the nematic range of the E-7 mixture is about 0° C. to about +60° C., whereas the nematic range of the E-8 mixture is about −10° C. to about +70° C. A eutectic mixture of three phenylcyclohexanes and one biphenylcyclohexane, commercially available as Merck 1132, from EM Laboratories, Darmstadt, West Germany, has a nematic range of −6° C. to +70° C. It is known that the operating temperature range of a liquid crystal composition may be broadened by adding another liquid crystal material which has a very high nematic-to-isotropic transition temperature material will raise the nematic-to-isotropic transisition temperature of the mixture, but, depending upon the interaction of the additive with the molecules of the original liquid crystal composition, the melting temperature (crystal-to-nematic transition temperature) may be increased and an incompatibility between the original and additive liquid crystal compositions may be found. There is, therefore, a very delicate balance of lateral and intermolecular attractions between molecules which allows a liquid crystal mixture to have a broad nematic range, while possessing stable structures, and which results are presently incapable of precise prediction when original and additive liquid crystal materials are mixed together to form a liquid crystal composition having a desired nematic temperature range.

BRIEF SUMMARY OF THE INVENTION

In accordance with the invention, nematic liquid crystal compositions having a broad operating temperature range from about 0° C. to about +85° C. are produced by mixing 75–90% by weight of a four-part liquid crystal composition of cyclohexane materials, with about 10% to about 25%, by weight, of a terphenyl liquid crystal material.

In several preferred embodiments, the four-part cycloclohexane composition, comprised of about 24%, by weight, of trans-4-n-Propyl-(4-cyanophenyl)-cyclohexane; 36%, by weight, of trans-4-n-Pentyl-(4-cyanophenyl)-cyclohexane; 25%, by weight, of trans-4-n-Heptyl-(4-cyanophenyl)-cyclohexane; and 15%, by weight, of trans-4-n-Pentyl-(4'-cyanobiphenyl-4)-cyclohexane, is mixed with 4-n-Pentyl-4"cyano-p-terphenyl. In one presently preferred mixture, 10%, by weight, of the biphenyl cyclohexane is added to a mixture of 75% of the 4-part cyclohexane composition and 15%, by weight, of the terphenyl composition, to achieve a nematic liquid crystal composition having an unusually broad temperature range from approximately 0° C. to about +103° C.

Accordingly it is one object of the present invention to provide liquid crystal compositions having broad nematic temperature ranges.

This and other objects of the present invention will become apparent upon consideration of the following detailed description.

DETAILED DESCRIPTION OF THE INVENTION

Liquid crystal compositions having broad nematic temperature ranges, wherein the compositions are in the liquid crystal phase over the temperature range from about 0° C. to at least 85° C., are formulated by combining between 10% and 25%, by weight, of the terphenyl liquid crystal additive 4-n-pentyl-4"cyano-p-terphenyl, available as T-15 (from E. Merck Co.), having the chemical formula:

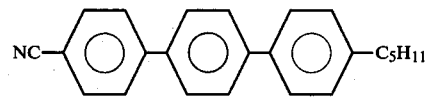

with about 75–90%, by weight, of a 4-part cyclohexane liquid crystal mixture. The cyclohexane mixture, commercially available as Merck 1132 (from E. Merck, Darmstadt, West Germany) is a mixture of about 24%, by weight, of trans-4-n-Propyl-(4-cyanophenyl)-cyclohexane, having the chemical formula

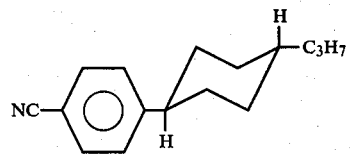

which constituent is available from E. Merck as Licristal ® S1103; about 36%, by weight, of trans-4-n-Pentyl-(4-cyanophenyl)-cyclohexane, having the chemical formula

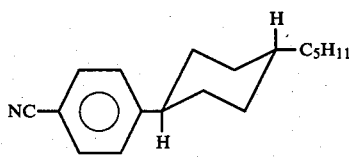

available as Licristal ® S1114; about 25%, by weight, of trans-4-n-Heptyl-(4-cyanophenyl)-cyclohexane, having a chemical formula

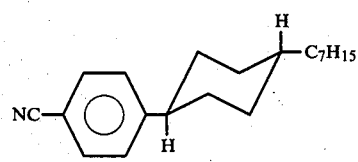

available as Licristal® S1115; and about 15%, by weight, of trans-4-n-Pentyl-(4'-cyanobiphenyl-4)-cyclohexane, having a chemical formula

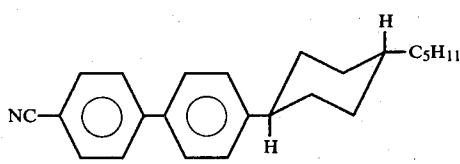

and available as Licristal® S1131.

In a first preferred liquid crystal composition, 10%, by weight, of the terphenyl additive (0.10 grams) is mixed with 90%, by weight, (0.90 grams) of the 4-part mixture, which may be formed of about 0.22 grams of the first constituent, about 0.32 grams of the second constituent, about 0.23 grams of the third constituent and about 0.14 grams of the fourth constituent thereof. The mixture is compatible at room temperature, showing a relatively low viscosity, and having a melting point temperature of about $-10°$ C. and a nematic-to-isotropic transition (clearing point) temperature of about $+87°$ C.

In a second presently preferred composition, about 17%, by weight, of the terphenyl additive (0.17 grams) is mixed with about 83%, by weight, (0.33 grams) of the 4-part cyclohexane mixture (about 0.20 grams of the first constituent, about 0.30 grams of the second constituent, about 0.21 grams of the third constituent and about 0.12 grams of the fourth constituent). This mixture appears compatible at room temperature and has a melting point temperature of approximately $0°$ C. and a nematic-to-isotropic transition (clearing point) temperature of about $+97°$ C.

A third composition (composition 3) adds about 25% by weight, of the terphenyl additive (0.25 grams) to about 75%, by weight, (0.75 grams) of the 4-part cyclohexane mixture (with about 0.18 grams of the first constituent, about 0.27 grams of the second constituent, about 0.19 grams of the third constituent and, about 0.11 grams of the fourth constituent) to provide a compatible mixture having a melting point at about $+18°$ C. and a nematic-to-isotropic (clearing point) temperature of $+109°$ C.

Another presently preferred liquid crystal composition (composition 4) is a mixture of 75%, by weight, (0.75 grams) of the 4-part mixture (with the first through fourth constituents being present, by weight, in respective proportions of about 0.18 grams, 0.27 grams, 0.19 grams and 0.11 gram), with an additional 10%, by weight, (0.10 grams) of the fourth constituent of trans-4-n-Pentyl-(4'-cyanobiphenyl-4)-cyclohexane, and 15%, by weight, (0.15 grams) of the terphenyl additive (0.15 grams). This mixture has a melting point temperature of approximately $0°$ C. and a clearing point temperature of approximately $103°$ C. The trans-4-n-Pentyl-(4'-cyanobiphenyl-4)-cyclohexane constituent itself has a nematic range of $+94°$ C. to $+219°$ C.

Composition four was evaluated by the addition of about 0.03 grams of an optically-active biphenyl material, 4 act-amyl-4'-cyanobiphenyl, having the chemical formula

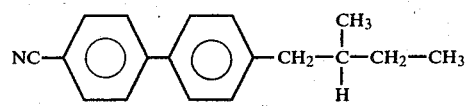

which is commercially available as CB-15 from E. Merck Co. and the further addition of about 0.003 grams of the dichroic dye 4,4'-bis-(4-N,N-diethylamino-2-methyl-phenylazo) azobenzene, as disclosed in U.S. Pat. No. 4,128,497, issued Dec. 5, 1978 and incorporated herein by reference. The dichroic dye has an order parameter S=0.78 and a wavelength of maximum absorption of 570 nanometers, in the 4-part cyclohexane composition, with no additives.

This cholesteric dichroic formulation was tested in a 12 micron cell with transparent conductive electrodes. Upon voltage application, the cholesteric helix unwound to the homeotropic nematic state with the optical appearance transitioning from an intense purple, in the no-voltage-applied condition, to substantially white in the voltage-applied condition. The threshold voltage was measured at about 5.8 volts, at $25°$ C., with a gradual decrease in threshold voltage as the temperature was increased, whereby, at $75°$ C., the threshold voltge was about 5.0 volts and at $95°$ C., the threshold voltage was about 4.5 volts. The cell displayed adequate contrast up to $95°$ C. with cessation of electro-optic effects occurring at about $103°$ C. as the liquid crystal composition entered the isotropic region.

The first composition was further tested by the addition to another sample of approximately 0.06 grams of the abovespecified dichroic dye. The dichroic nematic liquid crystal material thus formed was placed within the cavity of a liquid crystal display having cell walls treated to give parallel boundary conditions. A single polarizer was positioned on the 12 micron cell such that linearly polarized light was absorbed by the aligned dichroic dye-liquid crystal host layer. The colored state was intensely purple by transmission and, upon voltage activation, the dye-host molecules were reoriented to give a clear transparent state. The order parameter S of this guest dye-host liquid crystal system was measured to be 0.78, at room temperature, with order parameter being measured at greater than 0.60 at $75°$ C.

It has also been found that certain dyes will have superior alignment, and hence improved order parameter values, when dissolved in the first mixture. For example, a commercially available dichroic dye D-27 (available from E. Merck Co.) which is 1-hydroxy-4-(p-dimethylaminophenyl)-anthraquinone, having a chemical formula

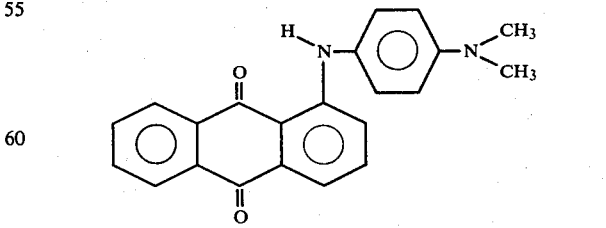

has order parameter S of about 0.62 in the commercially-available E-7 liquid crystal material, and order parameter S=0.64 in the Merck 1132 material, but has a higher order parameter S=0.67 when dissolved in composition 1. Accordingly, dichroic liquid crystal displays having improved contrast may be fabricated by use of certain known dichroic dyes dissolved in the first liquid crystal composition.

While several preferred liquid crystal compositions have been set forth in detail hereinabove, many variations or modifications will now become apparent to those skilled in the art. For example, other chiral additives known in the art could be used to give a guest-host effect utilizing the cholesteric to nematic transition.

Other terphenyls which would be of equal utility were published by G. W. Gray, K. J. Harrison and J. A. Nash, *J. Chem. Soc. Chem. Commun.*, 431 (1974).

| Compound | M.P. | Clearing Point |
| --- | --- | --- |
| 4-n-propyl-4''-cyano-p-terphenyl | 182° C. | 275.5° C. |
| 4-n-butyl-4''-cyano-p-terphenyl | 154° C. | 242° C. |
| 4-n-hexyl-4''-cyano-p-terphenyl | 125° C. | 228° C. |
| 4-n-heptyl-4''-cyano-p-terphenyl | 134° C. | 222° C. |
| 4-n-actyl-4''-cyano-p-terphenyl | 127° C. | 216° C. |

It is my intent, therefore, to be limited only by the scope of the appending claims and not by the specific details set forth herein.

What is claimed is:

1. A liquid crystal composition with a solid-to-nematic transition temperature of at most 0° C. and a nematic-to-isotropic transition temperature of at least 85° C. consisting of:
   about 85% to about 100%, by weight, of a liquid crystal host composition consisting of about 83% to about 90%, by weight, of a 4-part liquid crystal mixture consisting of about 21% to about 24% by weight of trans-4-n-Propyl-(4-cyanophenyl)-cyclohexane, having a chemical formula

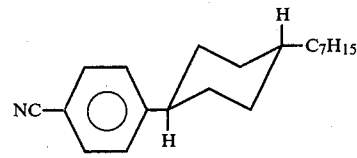

about 32% to about 36%, by weight, of trans-4-n-Pentyl-(4-cyanophenyl)-cyclohexane, having a chemical formula

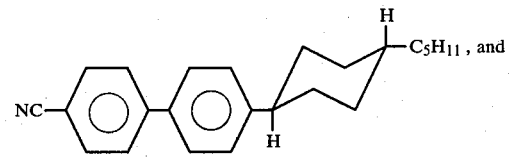

about 22% to about 25%, by weight, of trans-4-n-Heptyl-(4-cyanophenyl)-cyclohexane, having a chemical formula

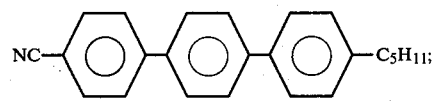

and about 15% to about 25%, by weight, of trans-4-n-Pentyl-(4'-cyanobiphenyl-4)-cyclohexane, having a chemical formula about 10% to about 17%, by weight, of 4-n-Pentyl-4''-cyano-p-terphenyl, having the chemical formula about 0% to about 5%, by weight, of an optically-active material dissolved in said host composition; and;
   about 0% to about 10%, by weight, of a dichroic dye dissolved in said host composition.

2. The liquid crystal composition of claim 1, wherein the liquid crystal host composition has about 90%, by weight, of the 4-part liquid crystal mixture, with about 24%, 36%, 25% and 15%, respectively, of said 4-part mixture being the respective first through fourth constituents thereof; and about 10%, by weight, of the terphenyl constituent.

3. The liquid crystal composition of claim 1, wherein the liquid crystal host composition has about 83%, by weight, of the 4-part liquid crystal mixture, with about 24%, 36%, 25% and 15%, respectively, of said 4-part mixture being the respective first through fourth constituents thereof; and about 17%, by weight, of the terphenyl constituent.

4. The liquid crystal composition of claim 1, wherein the liquid crystal host composition has about 85%, by weight, of the 4-part liquid crystal mixture, with about 21%, 32%, 22% and 25%, respectively, of said 4-part mixture being the respective first through fourth constituents thereof; and about 15%, by weight, of the terphenyl constituent.

* * * * *